US011194419B2

(12) United States Patent
Chung et al.

(10) Patent No.: US 11,194,419 B2
(45) Date of Patent: Dec. 7, 2021

(54) TOUCH SENSOR DISPLAY DEVICE AND INTERFACE METHOD THEREOF

(71) Applicant: LG Display Co., Ltd., Seoul (KR)

(72) Inventors: JuneGun Chung, Paju-si (KR); Youngwoo Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 81 days.

(21) Appl. No.: 16/704,709

(22) Filed: Dec. 5, 2019

(65) Prior Publication Data
US 2020/0192544 A1 Jun. 18, 2020

(30) Foreign Application Priority Data
Dec. 13, 2018 (KR) ........................ 10-2018-0161218

(51) Int. Cl.
*G06F 3/041* (2006.01)
*G09G 3/20* (2006.01)

(52) U.S. Cl.
CPC ........... *G06F 3/04164* (2019.05); *G09G 3/20* (2013.01); *G09G 2310/0278* (2013.01)

(58) Field of Classification Search
CPC ....... G06F 3/04164; G06F 3/044; G09G 3/20; G09G 2310/0278
See application file for complete search history.

(56) References Cited

U.S. PATENT DOCUMENTS

| 2010/0164546 | A1* | 7/2010 | Uchida | G06F 13/4217 326/86 |
| 2014/0145985 | A1* | 5/2014 | Akai | G06F 1/3262 345/173 |
| 2014/0160085 | A1* | 6/2014 | Rabii | G06F 1/3262 345/178 |
| 2014/0306903 | A1* | 10/2014 | Huang | G06F 3/0416 345/173 |
| 2017/0242529 | A1* | 8/2017 | Park | G06F 3/0443 |
| 2019/0020462 | A1* | 1/2019 | Suwald | G06F 13/4291 |
| 2020/0073122 | A1* | 3/2020 | Rothkopf | G02B 27/017 |

\* cited by examiner

*Primary Examiner* — Lixi C Simpson
(74) *Attorney, Agent, or Firm* — Fenwick & West LLP

(57) ABSTRACT

A touch sensor display device and an interface method thereof are provided. The touch sensor display device comprises a display panel in which a touch panel, gate lines, data lines, sensing lines, and subpixels are disposed; a gate driver circuit drives the gate lines; a data driver circuit drives the data lines; a touchscreen driver circuit drives the sensing lines, and includes a sleep module which controls switching to a sleep mode, and a wake-up module which performs a wake-up function to cancel and return to a normal state, and transmitting a sleep mode signal pattern or a wake-up signal pattern to the micro control unit; and a micro control unit determining whether a touch is detected, by the touchscreen driver circuit. Accordingly, power consumption is reduced in the display device. A mode change is performed by a driver circuit to enable rapid mode changes while reducing power consumption.

19 Claims, 20 Drawing Sheets

*FIG.14*

| Function | Interface Signal | SSN | SCLK | MOSI | MISO | Comment |
|---|---|---|---|---|---|---|
| Normal Operation | Value | 0 | Toggle | Toggle | Toggle | Register Setting, Touch Data Reading |
| | Direction | IN | IN | IN | OUT | |
| SLEEP WAKE-UP | Value | 1 | Toggle | Toggle | Toggle | Sleep Mode Wake Up |
| | Direction | IN | OUT | OUT | OUT | |

FIG.15

| SRIC State | Power State | SPI | SCLK/MOSI | TsyncN | State Transition |
|---|---|---|---|---|---|
| SRIC #1 | SLEEP | OFF | OUT | Protocol Function | Self Sleep |
| SRIC #2 | SLEEP | OFF | OUT | Protocol Function | Self Sleep |
| SRIC #3 | Normal | ON | IN | D/T Sync | Self Wake Up |
| SRIC #4 | Normal | ON | IN | D/T Sync | Self Wake Up |
| SRIC #5 | Normal | ON | IN | D/T Sync | Self Wake Up |
| SRIC #6 | SLEEP | OFF | OUT | Protocol Function | Self Sleep |
| SRIC #7 | Normal | ON | IN | D/T Sync | Self Wake Up |
| SRIC #8 | SLEEP | OFF | OUT | Protocol Function | Self Sleep |

*FIG.16*

| SCLK/MOSI | State | Method | Subject | comment |
|---|---|---|---|---|
| IN → OUT | Normal State | MOSI Protocol | MCU | IN-Maintaining according to MOSI Protocol |
| OUT → IN | Normal State | SSN = 1 & MISO = 1 | Touchscreen Driver Circuit | SPI request |
| | SLEEP | WAKE UP Signalling | Touchscreen Driver Circuit | WAKE-UP |
| | SCLK/MOSI = OUT | TsyncN = Toggle SSN = 0 | MCU | Entering Display Driving Period |

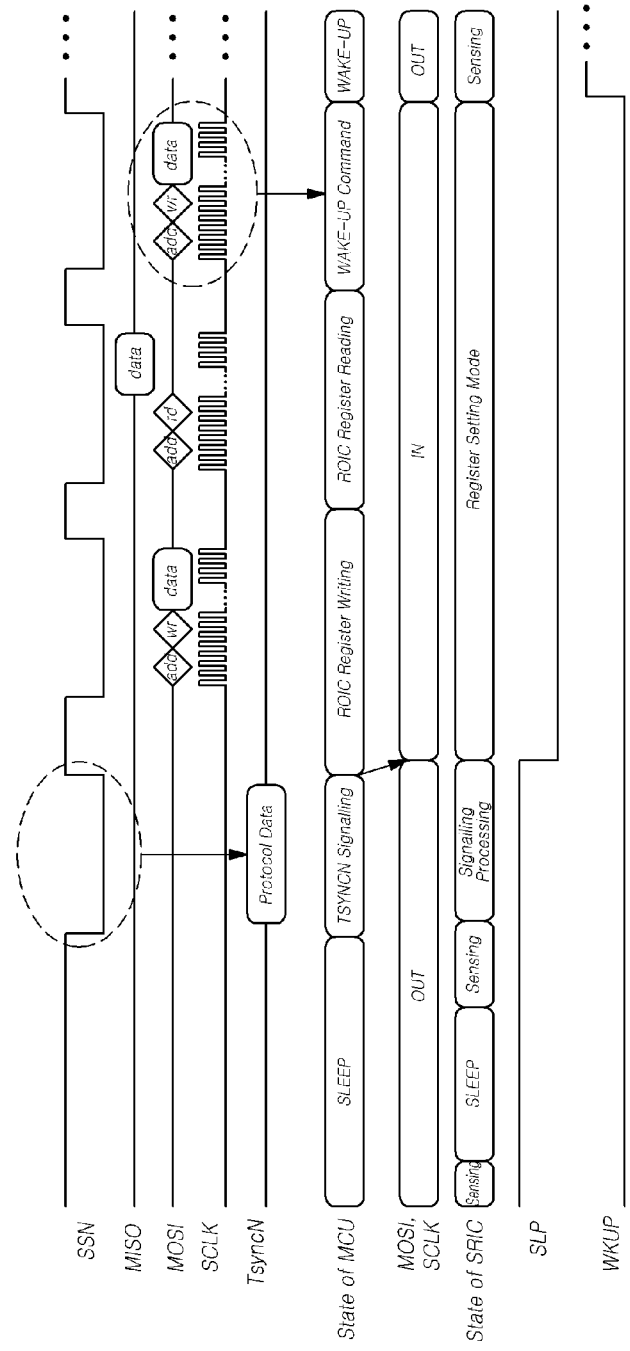

TOUCH SENSOR DISPLAY DEVICE AND INTERFACE METHOD THEREOF

CROSS REFERENCE TO RELATED APPLICATION

This application claims priority from Republic of Korea Patent Application No. 10-2018-0161218, filed on Dec. 13, 2018, which is hereby incorporated by reference in its entirety.

BACKGROUND

Field

Embodiments relate to a touch sensor display device and a method of interfacing touch sensing data.

Description of Related Art

With the development of multimedia, the importance of flat panel display devices has increased. Responsively, flat panel display devices, such as liquid crystal display (LCD), plasma display panels (PDPs), and organic light-emitting display, have been introduced onto the market. Among such flat display devices, LCD devices are widely used as mobile flat display devices, due to advantages thereof, such as excellent image quality, lightweight, a thin profile, and low power consumption. In particular, LCD are variously used in notebook computers, computer monitors, televisions (TVs), and the like.

Touch sensor display devices provided by stacking a touch panel on such an LCD are widely used. When the touch panel is touched by a finger, a stylus pen, or the like, a touch point is detected based on a change in electric characteristics, such as resistance or capacitance, of the touch point, so that information corresponding to the touch point can be output or a calculation (or operation) corresponding to the touch point can be performed. The touch sensor display device is one type of user interface, and applications thereof are increasingly being applied to small portable terminals, office devices, mobile devices, and the like.

However, such a touch sensor display device, fabricated by stacking a separate touch panel on a display panel, has the following problems. The stacked touch panel may increase the thickness of the touch sensor display device, thereby making it difficult to fabricate such a touch sensor display device having a thinner profile. The transmission of light may be reduced by the stacked touch panel. In addition, fabrication costs may be increased. To overcome such problems, touch sensor display devices using advanced in-cell touch (AIT) technology have recently been proposed. In such a touch sensor display device, touch sensors are embedded in pixel areas thereof.

In touch sensor display devices having touch sensors embedded in pixel areas, touch sensors can be mounted on a display panel without increasing the thickness of the display panel. The touch sensor display device uses a method of dividing a display driving period, in which pixels are driven, and a touch driving period, in which touch sensors are driven, in a time division method to reduce mutual interference due to coupling between pixels and touch sensors.

In the process of dividing the display driving period and the touch driving period in a time division method, if no touch has been detected for a predetermined period according to the result of touch sensing on the display panel, the touch sensor display device enters a sleep mode or an idle mode to operate a minimum number of circuit blocks to reduce power consumption. Here, a process of continuously determining whether or not a touch input is continuously applied is required. Accordingly, unnecessary power consumption may still occur, which is problematic.

SUMMARY

Various aspects provide a touch sensor display device and an interface method thereof, in which power consumption can be reduced.

Also provided are a touch sensor display device and an interface method thereof, in which a mode change can be performed by a driver circuit to enable rapid mode changes while reducing power consumption.

According to an aspect, a touch sensor display device may include: a display panel in which a touch panel, a plurality of gate lines, a plurality of data lines, a plurality of sensing lines, and a plurality of subpixels are disposed; a gate driver circuit disposed on one side of the display panel to drive the plurality of gate lines; a data driver circuit disposed on one side of the display panel to drive the plurality of data lines; a touchscreen driver circuit disposed on one side of the display panel to drive the plurality of sensing lines, and including a sleep module which controls switching to a sleep mode, and a wake-up module which performs a wake-up function to cancel and return to a normal state, and transmitting a sleep mode signal pattern or a wake-up signal pattern to the micro control unit using a bidirectional interface signal; and a micro control unit determining whether or not a touch is detected, by the touchscreen driver circuit.

The sleep module may include: a first comparator comparing touch sensing data transmitted through the plurality of sensing lines with minimum touch sensing data; a counter counting the number of situations in which the touch sensing data is smaller than the minimum touch sensing data, according to an output value of the first comparator; a second comparator comparing a count value of the counter with a minimum count value; and a state output element receiving an output of the second comparator, and if the value count of the counter is equal to or greater than the minimum count value, generating a sleep mode signal.

The wake-up module may include: a first comparator comparing touch sensing data transmitted through the plurality of sensing lines with minimum touch sensing data; a second comparator comparing the touch sensing data transmitted through the plurality of sensing lines with maximum touch sensing data; a first counter counting the number of situations in which the touch sensing data is greater than the minimum touch sensing data, according to an output value of the first comparator; a second counter counting the number of situations in which the touch sensing data is smaller than the maximum touch sensing data, according to an output value of the second comparator; a third comparator comparing a count value of the first counter with a minimum count value; a fourth comparator comparing a count value of the second counter with a maximum count value; and a state output element receiving outputs of the third and fourth comparators, and if the count value of the first counter is equal to or greater than the minimum count value and the count value of the second counter is equal to or greater than the maximum count value, generating a wake-up signal.

The bidirectional interface signal may be a clock signal and a master data signal.

The touchscreen driver circuit may include: a sleep mode signal pattern generator receiving a sleep mode signal transmitted by the sleep module and generating the sleep mode signal pattern; a wake-up signal pattern generator receiving a wake-up signal transmitted by the wake-up module and generating the wake-up signal pattern; and a switch circuit controlling a direction, in which the bidirectional interface signal is transmitted, using a reference signal.

The reference signal may be a touch synchronization signal and a slave selection signal.

If the touch synchronization signal is applied as a pulse, the touchscreen driver circuit may control a transition from a display driving period to a touch driving period.

In a low-level state of the slave selection signal, if predetermined protocol data is input to the touch synchronization signal, the direction, in which the bidirectional interface signal is transmitted, may be set to be a direction from the micro control unit to the touchscreen driver circuit.

According to another aspect, provided is a touchscreen driver circuit in a touch sensor display device. The touch sensor display device includes a display panel in which a plurality of gate lines, a plurality of data lines, a plurality of sensing lines, and a plurality of subpixels are disposed, a gate driver circuit driving the plurality of gate lines, a data driver circuit driving the plurality of data lines, the touchscreen driver circuit driving a plurality of sensing lines, and a micro control unit determining whether or not a touch is detected, by the touchscreen driver circuit. The touchscreen driver circuit may include: a sleep module controlling switching to a sleep mode; and a wake-up module performing a wake-up function to cancel and return to a normal state, wherein the touchscreen driver circuit transmits a sleep mode signal pattern or a wake-up signal pattern to the micro control unit using a bidirectional interface signal.

According to another aspect, provided is an interface method of a touch sensor display device. The touch sensor display device includes a display panel in which a plurality of gate lines, a plurality of data lines, a plurality of sensing lines, and a plurality of subpixels are disposed, a gate driver circuit driving the plurality of gate lines, a data driver circuit driving the plurality of data lines, a touchscreen driver circuit driving a plurality of sensing lines, and a micro control unit determining whether or not a touch is detected, by the touchscreen driver circuit. The interface method may include: if a touch sensing signal has not been input for a predetermined period through the sensing line, determining, by the touchscreen driver circuit, to switch to a sleep mode, and outputting a sleep mode signal; if the touch sensing signal is input in the sleep mode, determining, by the touchscreen driver circuit, to perform a wake-up function, and outputting a wake-up signal; and receiving the sleep mode signal or the wake-up signal and determine to enter the sleep mode or perform the wake-up function. The touchscreen driver circuit transmits a sleep mode signal pattern or a wake-up signal pattern to the micro control unit using a bidirectional interface signal.

BRIEF DESCRIPTION OF THE DRAWINGS

The above and other objects, features, and advantages of the present disclosure will be more clearly understood from the following detailed description, taken in conjunction with the accompanying drawings, in which:

FIG. 14 is a table illustrating values of interface signals and signal transfer directions according to respective states in the touch sensor display device according to embodiments;

FIG. 15 is a table illustrating a situation in which mode switching is controlled in an SRIC-specific manner in the touch sensor display device according to embodiments;

FIG. 16 is a table illustrating a situation in which the direction of transmission of the clock signal SCLK and the master data is changed in the touch sensor display device according to embodiments;

FIG. 19 is a signal waveform diagram illustrating a situation in which entering the wake-up function is performed under the control of the micro control unit in the touch sensor display device according to embodiments.

DETAILED DESCRIPTION

Figure 1:
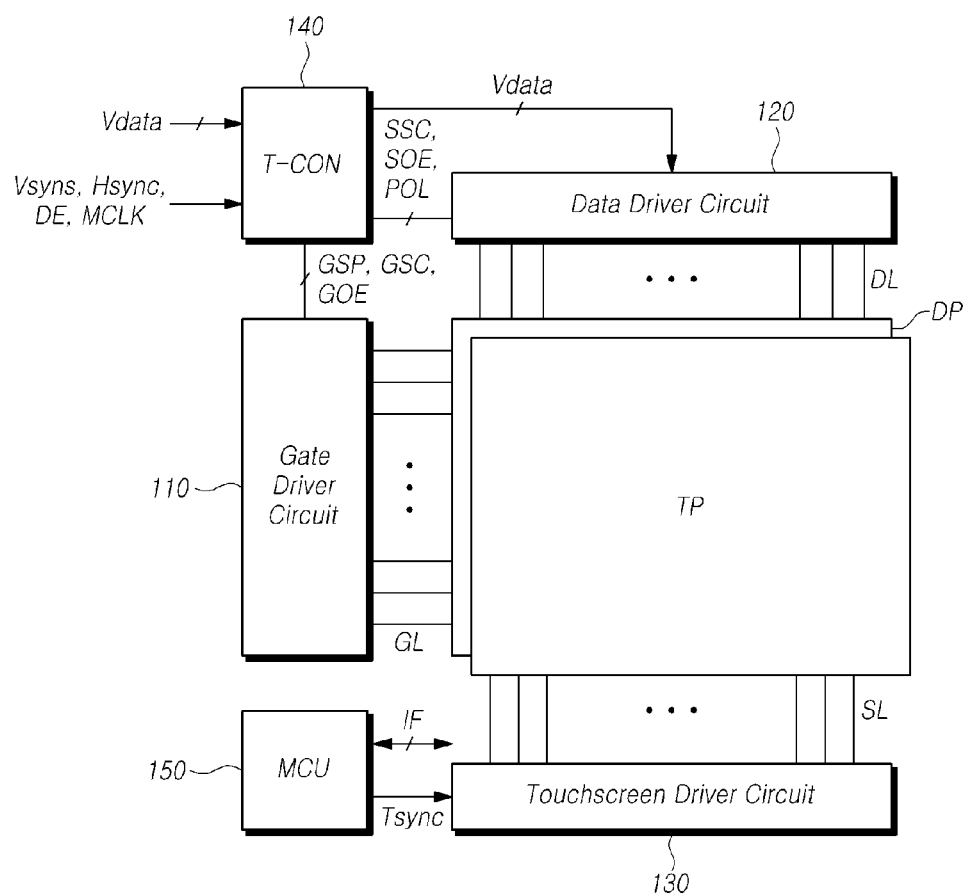
FIG. 1 is a block diagram illustrating a touch sensor display device according to embodiments.

The advantages and features of the present disclosure and methods of the realization thereof will be apparent with reference to the accompanying drawings and detailed descriptions of the embodiments. The present disclosure should not be construed as being limited to the embodiments set forth herein and may be embodied in many different forms. Rather, these embodiments are provided so that the present disclosure will be thorough and complete, and will fully convey the scope of the present disclosure to those having ordinary knowledge in the technical field. The scope of the present disclosure shall be defined by the appended Claims.

The shapes, sizes, ratios, angles, numbers, and the like, inscribed in the drawings to illustrate exemplary embodiments are illustrative only, and the present disclosure is not limited to the embodiments illustrated in the drawings. Throughout this document, the same reference numerals and symbols will be used to designate the same or like components. In the following description of the present disclosure, detailed descriptions of known functions and components incorporated into the present disclosure will be omitted in the situation in which the subject matter of the present disclosure may be rendered unclear thereby. It will be understood that the terms "comprise," "include," "have," and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of a component, it shall be understood that an error range is included therein, even in the situation in which there is no explicit description thereof.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element. When spatially relative terms, such as "on," "above," "under," "below," and "on a side of," are used herein for descriptions of relationships between one element or component and another element or component, one or more intervening elements or components may be present between the one and other elements or components, unless a term, such as "directly," is used.

In addition, terms, such as "first" and "second" may be used herein to describe a variety of components. It should be understood, however, that these components are not limited by these terms. These terms are merely used to discriminate one element or component from other elements or components. Thus, a first component referred to as first hereinafter may be a second component within the spirit of the present disclosure.

The features of exemplary embodiments of the present disclosure may be partially or entirely coupled or combined with each other and may work in concert with each other or may operate in a variety of technical methods. In addition, respective exemplary embodiments may be carried out independently or may be associated with and carried out in concert with other embodiments.

Hereinafter, embodiments of the present disclosure will be described in detail with reference to the accompanying drawings.

FIG. 1 is a block diagram illustrating a touch sensor display device according to embodiments.

Referring to FIG. 1, the touch sensor display device according to embodiments may include a display panel DP, a gate driver circuit 110, a data driver circuit 120, a touch-screen driver circuit 130, a timing controller (T-CON) 140, and a micro control unit (MCU) 150.

The display panel DP displays an image based on a scan signal SCAN transferred from the gate driver circuit 110 through gate lines GL and an image data Vdata transferred through the data driver circuit 120 through data lines DL. The display panel DP includes a liquid crystal layer interposed between two substrates. The liquid crystal layer can be driven in any known mode, such as a twisted nematic (TN) mode, a vertical alignment (VA) mode, an in-plane switching (IPS) mode, or a fringe field switching (FFS) mode.

A plurality of subpixels SP of the display panel DP may be defined by a plurality of data lines DL and a plurality of gate lines GL. A single subpixel SP includes a thin-film transistor (TFT) provided in an area in which a single data line DL intersects a single gate line GL, a pixel electrode, such as an organic light-emitting diode (OLED), in which the image data Vdata is charged, a storage capacitor Cst electrically connected to the organic light-emitting diode OLED to maintain the voltage, and the like.

A black matrix, a color filter, and the like, may be provided on the top substrate of the display panel DP, while TFTs, pixel electrodes, a common electrode, and the like, may be provided on the bottom substrate of the display panel DP. The display panel DP may be provided using a color filter on (COT) structure. In this case, the black matrix and the color filter may be provided on the bottom substrate of the display panel DP.

The common electrode, to which a common voltage Vcom is supplied, may be provided on the top substrate or the bottom substrate of the display panel DP. A polarizer is attached to each of the top substrate and the bottom substrate of the display panel DP, and alignment layers for setting the tilt angle of liquid crystal molecules are provided on inner surfaces in contact with the liquid crystal molecules.

Column spacers for maintaining a cell gap of liquid crystal cells are provided between the top substrate and the bottom substrate of the display panel DP. A backlight unit is disposed below the bottom surface of the bottom polarizer of the display panel DP. The backlight unit may be implemented as an edge type backlight unit or a direct type backlight unit to illuminate the display panel DP.

In a touch panel TP, a plurality of touch electrodes TE corresponding to a touch sensor may be disposed, and a plurality of sensing lines, through which the plurality of touch electrodes TE and the touchscreen driver circuit 130 are electrically connected, may be disposed. Here, a touch sensing method may include a self-capacitance method of determining the presence of a touch and a touch location using capacitance between a touch electrode TE and a touch object, such as a finger, and a mutual capacitance method of determining the presence of a touch and a touch location using capacitance between touch electrodes TE.

In the self-capacitance method, each of the touch electrodes TE can serve as a driving electrode (or a transmitter electrode) to which a touch driving signal TDS is applied and a sensing electrode (or a receiver electrode) from which a touch sensing signal TSS is detected. In the mutual capacitance method, the touch electrodes TE are divided into driving electrodes to which the touch driving signal TDS is applied and sensing electrodes from which the touch sensing signal TSS is detected.

Here, the touch panel TP may be an external touch panel (also referred to as an add-on touch panel) present externally of the display panel 110 or an embedded touch panel (also referred to as an in-cell touch panel or an on-cell touch panel) embedded in the display panel 110. Although the plurality of touch electrodes TE, provided in the touch panel TP, serve as a touch sensor in a touch sensing period, the plurality of touch electrodes TE may serve as a common electrode CE to which a common voltage Vcom is applied to display an image data in a display period.

The timing controller 140 controls the gate driver circuit 110 and the data driver circuit 120. The timing controller 140 receives timing signals, such as a vertical synchronization signal Vsync, a horizontal synchronization signal Hsync, a data enable signal DE, and a main clock signal MCLK, as well as image data Vdata from a host system (not shown).

The timing controller 140 controls the gate driver circuit 110, on the basis of scan timing control signals, such as a gate start pulse signal GSP, a gate shift clock signal GSC, and a gate output enable signal GOE. In addition, the timing controller 140 controls the data driver circuit 120, based on data timing control signals, such as a source sampling clock signal SSC, a polarity control signal POL, and a source output enable signal SOE.

The gate driver circuit 110 sequentially drives the plurality of gate lines GL by sequentially supplying the scan signal SCAN to the display panel DP through the plurality of gate lines GL. Here, the gate driver circuit 110 may also be referred to as a scan driver circuit or a gate driver integrated circuit (GDIC).

The gate driver circuit 110 sequentially supplies the scan signal SCAN having an on or off voltage to the plurality of gate lines GL, under the control of the timing controller 140. In this regard, the gate driver circuit 110 may include a shift register, a level shifter, and the like.

The gate driver circuit 110 may be disposed on one side (e.g. on or adjacent to a left or right portion) of the display panel DP. In some cases, the data driver 110 may be disposed on both sides (e.g. on or adjacent to left and right portions) of the display panel DP.

The data driver circuit 120 drives the plurality of data lines DL by supplying the image data Vdata, received from the timing controller 140, to the plurality of data lines DL. Here, the data driver circuit 120 may also be referred to as a source driver circuit or a source driver integrated circuit (SDIC).

When a specific gate line GL is opened by the gate driver circuit 110, the data driver circuit 120 converts the image data Vdata, received from the timing controller 140, into an analog data voltage, and supplies the analog data voltage to the plurality of data lines DL.

The data driver circuit 120 may be located on one side (e.g. on or adjacent to the upper or lower portion) of the display panel DP, or may be located on both sides (on or adjacent to the upper and lower portions) of the display panel DP, depending on the driving system, the design, or the like.

The data driver circuit 120 may include a shift register, a latch circuit, a digital-to-analog converter (DAC), an output buffer, and the like. Here, the digital-to-analog converter is a component for converting the image data Vdata, received from the timing controller 140, into an analog image data voltage to be supplied to the data lines DL.

The touchscreen driver circuit 130 detects a touch made on the display panel DP and detects a touch location on the surface of the display panel DP. The touchscreen driver circuit 130 may include a driver circuit generating a driving voltage to drive touch sensors and a sensor circuit generating data to sense the touch sensors and detect the touch, information regarding touch coordinates, and the like.

The touchscreen driver circuit 130 may be provided on an outer substrate in contact with the display panel DP. The touchscreen driver circuit 130 is connected to the display panel DP via a plurality of sensing lines SL. The touchscreen driver circuit 130 can detect the presence of the touch and the touch location, based on variations in capacitance among the touch sensors in the display panel DP. That is, a variation in capacitance occurs between a location touched by a finger of a user and a location not touched by the finger, and the touchscreen driver circuit 130 detects the presence of the touch and the touch location by detecting the variation in capacitance. The touchscreen driver circuit 130 generates a touch sensing voltage Vts regarding the present of the touch and the touch location, and transfers the touch sensing voltage Vts to the micro control unit 150.

The micro control unit 150 controls the touchscreen driver circuit 130. The micro control unit 150 can receive a control synchronization signal from the timing controller 140 and generate a touch synchronization signal Tsync, based on the control synchronization signal, control the touchscreen driver circuit 130. The micro control unit 150 transmits a touch sensing voltage Vts or the like to and receives a touch sensing signal or the like from the touchscreen driver circuit 130, using an interface defined therebetween.

Here, the micro control unit 150 may be combined with the touchscreen driver circuit 130 into a touch control circuit comprised of a single integrated circuit (IC), or may be combined with the timing controller 140 into a control circuit comprised of a single IC.

In addition, the touch sensor display device may further include a memory (MEM). The memory can temporarily store image data output from the timing controller 140, and can output the image data Vdata to the data driver circuit 120 at a preset timing. The memory may be disposed within or outside of the data driver circuit 120. In a situation in which the memory is disposed outside of the data driver circuit 120, the memory may be disposed between the timing controller 140 and the data driver circuit 120. In addition, the memory may include a buffer memory to store the image data Vdata received from an external source and supply the stored image data Vdata to the timing controller 140.

In addition, the touch sensor display device may further include an interface enabling signal input and output to and from, or communications with, other external electronic devices or electronic components. For example, the interface may include at least one of a low-voltage differential signaling (LVDS) interface, a mobile industry processor interface (MIPI) serial interface, or a combination thereof.

Figure 2:
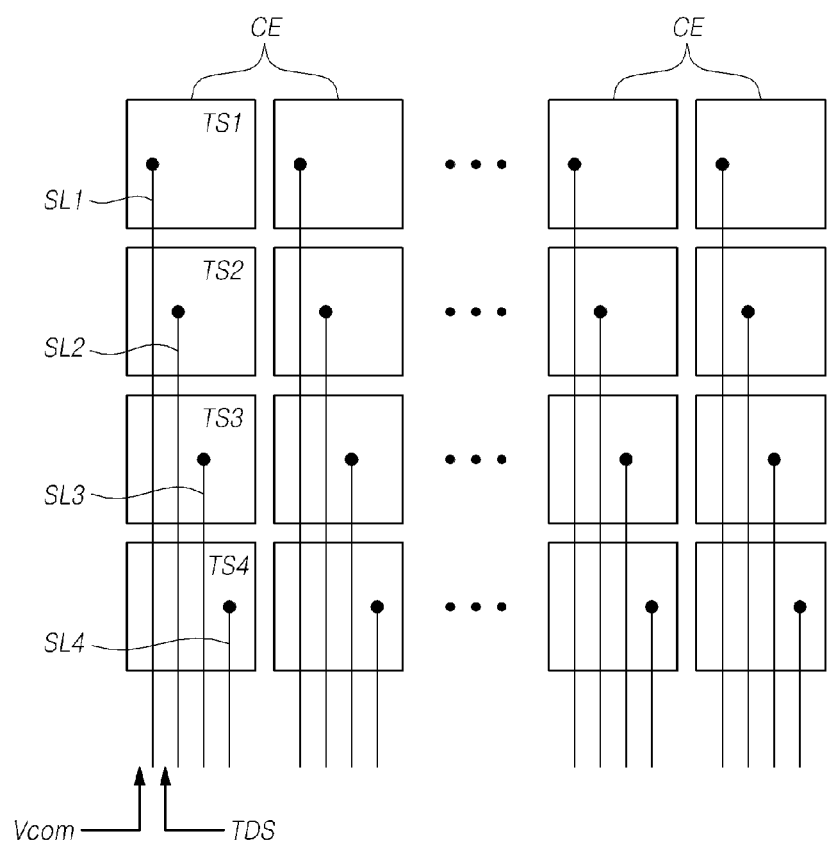
FIG. 2 is a block diagram illustrating touch sensors provided in the display panel of the touch sensor display device according to embodiments.

FIG. 2 is a block diagram illustrating touch sensors provided in the display panel of the touch sensor display device according to embodiments.

Referring to FIG. 2, the touch panel may be configured to be embedded in a pixel array area of the display panel DP, based on an in-cell scheme. Here, the touch panel TP based on the in-cell scheme can use a common electrode CE provided within the display panel DP as blocks or points, as touch sensors TS (e.g., TS1 to TS4).

In the touch panel TP based on the in-cell scheme, a segment of the common electrode CE, included in some of the plurality of subpixels SP provided within the display panel DP, forms a single touch sensor TS. The touch sensors TS may be defined by the divided segments of the common electrode CE in the display panel DP.

The plurality of touch sensors TS may be arrayed in rows and columns within an active area of the display panel DP. Each of the touch sensors TS may be connected to a sensing line SL, through which a touch sensing signal TSS is transferred.

Figure 3:
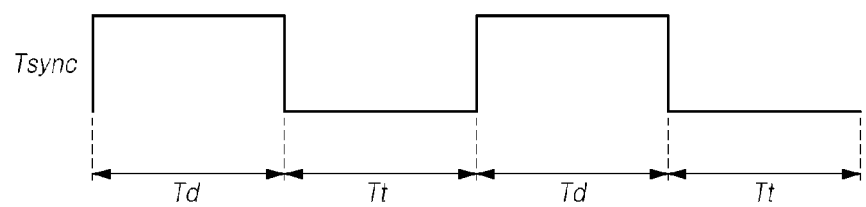
FIG. 3 is a signal flow diagram illustrating timing division driving of the in-cell scheme in the touch sensor display device according to one embodiment.

FIG. 3 is a signal flow diagram illustrating timing division driving of the in-cell scheme in the touch sensor display device.

Referring to FIG. 3, in the touch sensor display device based on the in-cell scheme, a display driving period Td, in which an image is displayed on the display panel DP, and a touch driving period Tt, in which the display panel DP is sensed, can be divided in a time division manner. Thus, the touch sensor display device is driven in the display driving period Td and the touch driving period Tt in a time division manner.

The touchscreen driver circuit 130 applies a touch driving signal TDS to the display panel DP through the sensing lines SL connected therebetween. During the touch driving period Tt, the touch driving signal TDS can be supplied to the sensing lines SL, so that a touch sensing signal TSS can be received by the touch sensors TS. During the display driving period Td, a common voltage Vcom can be supplied to the sensing lines SL, so that an image can be displayed on the display panel DP. Here, the time division between the display driving period Td and the touch driving period Tt can be enabled by a touch synchronization signal Tsync.

Figure 4:
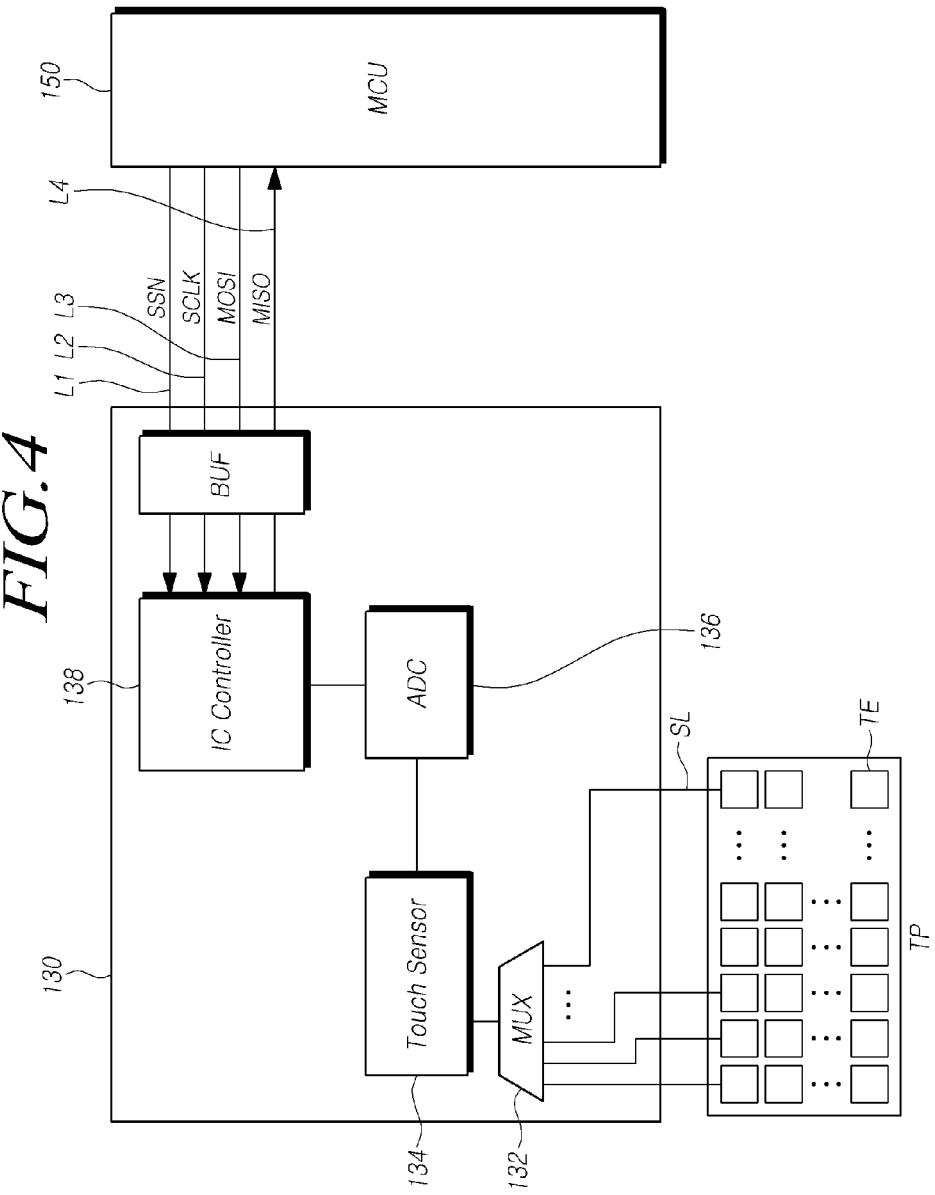
FIG. 4 is a block diagram schematically illustrating the touchscreen driver circuit and the micro control unit of the touch sensor display device according to one embodiment.

FIG. 4 is a block diagram schematically illustrating the touchscreen driver circuit and the micro control unit of the touch sensor display device.

Referring to FIG. 4, the touchscreen driver circuit 130 drives the touch panel TP during a touch sensing period Tt, and selectively detects touch sensing signals TSS using a multiplexer (MUX) 132, the touch sensing signals TSS varying, depending on whether or not a touch has been made. The micro control unit 150 determines whether or not the touch has been made and a touch location, on the basis of the result of the detection of the touch sensing signal by the touchscreen driver circuit 130.

The touchscreen driver circuit 130 can output a touch driving signal TDS to two or more touch electrodes TE, select one touch sensing signal TSS from among the touch sensing signals TSS, detected from the touch electrodes TE to which the touch driving signal TDS is applied, using the multiplexer 132, and convert the selected touch sensing signal TSS into touch sensing data having a digital value using an analog-to-digital converter (ADC) 136. The converted touch sensing data can be transmitted to the micro control unit 150 via an integrated circuit (IC) controller 138, and the micro control unit 150 can receive the touch sensing data and detect touch information regarding whether or not the touch has been made and the touch location, based on the touch sensing data.

Here, the touchscreen driver circuit 130 and the micro control unit 150 may be regarded as a master-slave structure, in terms of parallel processing. The micro control unit 150 may be regarded as a master, performing overall control of the touchscreen driver circuit 130, while the touchscreen driver circuit 130 may be regarded as a slave, performing a touch sensing operation, under the control of the micro control unit 150.

In this regard, the touchscreen driver circuit 130 may include a touch sensor 134 and the IC controller 138 serving as a slave, and the IC controller 138 of the touchscreen driver circuit 130 and the micro control unit 150 may transmit data to and receive data from each other via a communications interface (IF).

The communications interface between the touchscreen driver circuit 130 and the micro control unit 150 may be, for example, a serial peripheral interface (SPI). The communications interface between the touchscreen driver circuit 130 and the micro control unit 150 may include a slave selection signal line L1, a clock signal line L2, a master data output line L3, and a slave data output line L4.

The slave selection signal line L1 is a signal line, through which the micro control unit 150 outputs a slave selection signal SSN to select the touchscreen driver circuit 130 supposed to perform the touch sensing operation. In a situation in which the touchscreen driver circuit 130 is implemented as an IC chip, the slave selection signal SSN may be a chip selection signal. In this case, the slave selection signal line L1 may be a chip selection line. The clock signal line L2 is a signal line, through which the micro control unit 150 transmits a clock signal SCLK to the touchscreen driver circuit 130. The master data output line L3 is a signal line, through which the micro control unit 150 transmits master data MOSI to the touchscreen driver circuit 130. The slave data output line L4 is a signal line, through which the touchscreen driver circuit 130 transmits slave data MISO to the micro control unit 150.

The micro control unit 150 can transmit the master data MOSI to the touchscreen driver circuit 130, in synchronization with the clock signal SCLK transmitted through the clock signal line L2. Here, the master data MOSI may include information necessary for communications with the touchscreen driver circuit 130, information necessary to control the operation of the touchscreen driver circuit 130, and the like, as Write Data.

The touchscreen driver circuit 130 can transmit the slave data MISO to the micro control unit 150, in synchronization with the clock signal SCLK transmitted through the clock signal line L2. The slave data MISO may include the touch sensing data, generated by the touch driving of the touchscreen driver circuit 130, and the like, as Read Data.

Here, since the micro control unit 150 transmits the master data MOSI in synchronization with the clock signal SCLK, the touchscreen driver circuit 130 can accurately read the master data MOSI transmitted by the micro control unit 150. In addition, since the touchscreen driver circuit 130 transmits the slave data MISO in synchronization with the clock signal SCLK, the micro control unit 150 can accurately read the slave data MISO transmitted by the touchscreen driver circuit 130.

For example, in a state in which the touch sensing data obtained using the touch sensor 134 and the analog-to-digital converter 136 is temporarily stored in a buffer BUF, the touch sensing data is announced to the micro control unit 150 by an interface request signal SPI Request. When a protocol (e.g. SSN=1, and MISO=1) corresponding to the interface request signal SPI Request is input, the micro control unit 150 reads the touch sensing data in the buffer BUF and stores the touch sensing data in an internal memory thereof. Afterwards, the micro control unit 150 performs post processing, e.g. extracts touch coordinates, by processing the touch sensing data stored in the internal memory thereof.

In a situation in which the user does not use the display device, the touch sensor display device enters a sleep mode or an idle mode to reduce power consumption. When the user touches the display device, the touch sensor display device performs a wake-up function to operate normally (e.g. to perform display driving and touch driving).

Figure 5A:
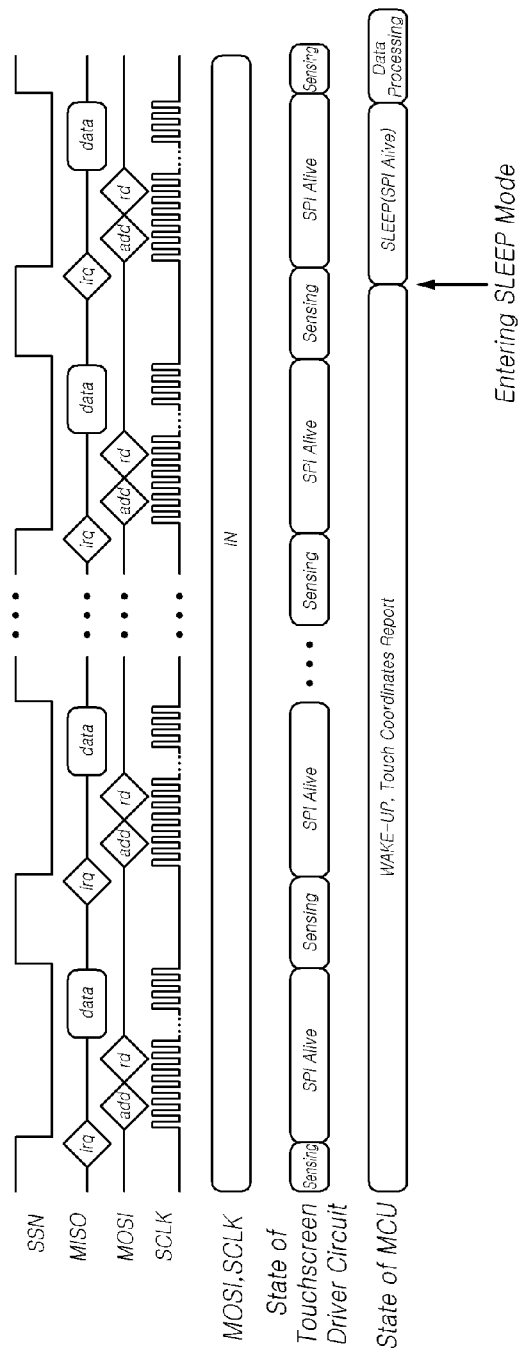
FIG. 5A and FIG. 5B illustrate a signal flow in a situation in which the touch sensor display device enters a sleep mode and a signal flow a situation in which the touch sensor display device returns to a normal mode using a wake-up function, respectively according to one embodiment.
Figure 5B:
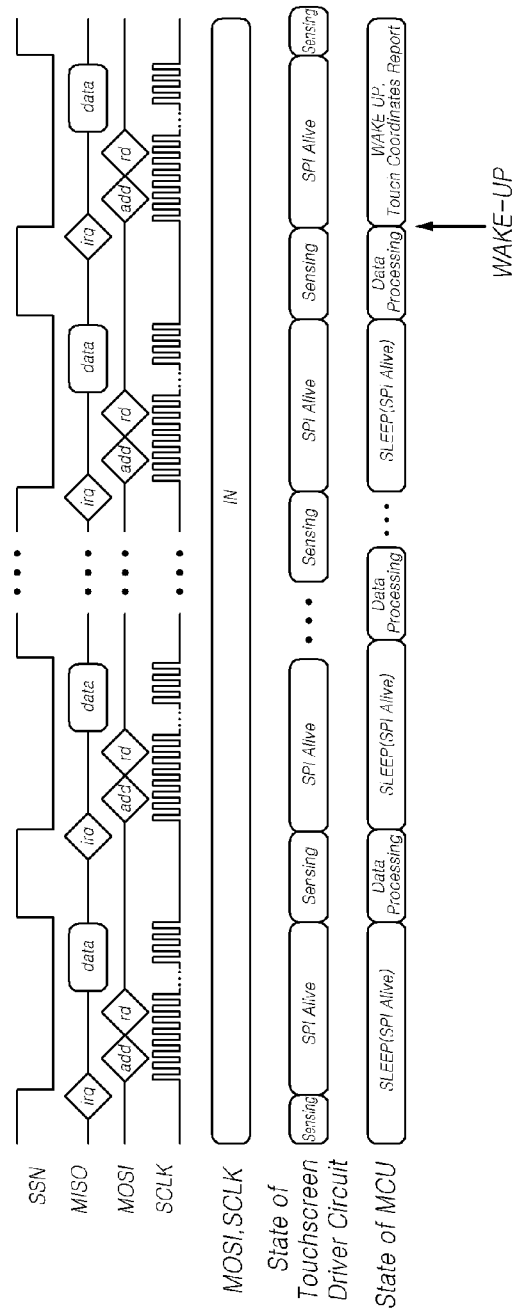

FIG. 5A illustrates a signal flow in a situation in which the touch sensor display device enters a sleep mode SLEEP, and FIG. 5B illustrates a signal flow in a situation in which the touch sensor display device returns to a normal mode using a wake-up function WAKE-UP.

First, referring to FIG. 5A, the touchscreen driver circuit 130 generates a protocol (e.g. SSN=1, and MISO=1) corresponding to an interface request to transmit touch sensing data to the micro control unit 150. In response to the interface request from the touchscreen driver circuit 130, the micro control unit 150 performs post processing, e.g. extracts touch coordinates, by reading the touch sensing data temporarily stored in the touchscreen driver circuit 130. Here, if the touch sensing data, in particular, touch coordinate data, is not transmitted by the touchscreen driver circuit 130, the micro control unit 150 determines that no touch input has been made and enters a sleep mode SLEEP to interrupt the operation of some circuit blocks, thereby reducing power consumption.

When a user touches the touch panel TP in the sleep mode SLEEP, touch coordinate data is transmitted to the micro control unit 150, as illustrated in FIG. 5B. The micro control unit 150 cancels the sleep mode SLEEP by performing a wake-up function WAKE-UP, and normally processes the touch sensing data input to the touch panel TP.

If no touch input has been made to the touch panel TP for a predetermined time (e.g. tens of frames), the micro control unit 150 enters the sleep mode SLEEP by register setting. In the sleep mode SLEEP, the micro control unit 150 reduces power consumption by cutting off the supply of power to some analog circuit blocks. Here, the micro control unit 150 continuously detects whether or not a touch input has been made by operating a minimum number of analog circuit blocks. That is, the touchscreen driver circuit 130 must continuously transmit a signal to the micro control unit 150 via the interface and the micro control unit 150 must continuously operate to detect the touch sensing data, so that the micro control unit 150 can detect whether or not a touch input has been made to the touch panel TP, even in the sleep mode SLEEP. Consequently, the operation of the touchscreen driver circuit 130 and the operation of the micro control unit 150 continue even when the sleep mode SLEEP is enabled, thereby making it difficult to effectively reduce power consumption.

The touch sensor display device according to the present disclosure may be adapted such that the touchscreen driver circuit 130 can control the operation of switching to the sleep mode SLEEP and perform the wake-up function WAKE-UP, instead of the micro control unit 150, to reduce operations, such as mode switching, performed by the micro control unit 150 and reduce power consumption.

Figure 6:
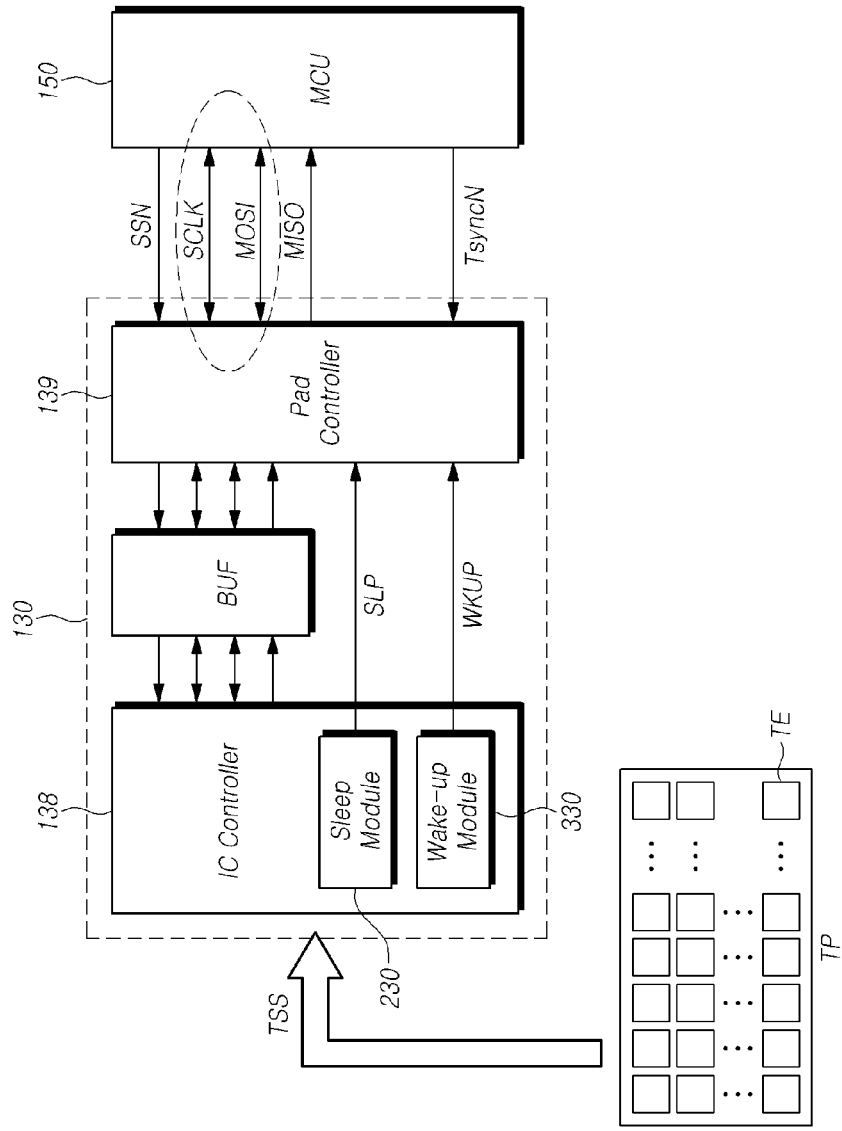
FIG. 6 is a block diagram illustrating a signal processing concept of the touch sensor display device according to embodiments.

FIG. 6 is a block diagram illustrating a signal processing concept of the touch sensor display device according to embodiments.

Referring to FIG. 6, in the touch sensor display device according to the present disclosure, the function of entering the sleep mode SLEEP and the wake-up function WAKE-UP may be realized within the IC controller 138 of the touchscreen driver circuit 130, using hardware or a module. That is, even though the touchscreen driver circuit 130 may enter the sleep mode SLEEP or perform the wake-up function WAKE-UP by a command of the micro control unit 150, the touchscreen driver circuit 130 may be provided with a sleep module 230 and a wake-up module 330 to enter the sleep mode SLEEP or perform the wake-up function WAKE-UP by self-determination thereof. Here, the sleep module 230 and the wake-up module 330 may be disposed inside or outside of the IC controller 138.

In this regard, it is necessary to modify some of interface specifications between the touchscreen driver circuit 130 and the micro control unit 150. For example, in the touch sensor display device according to the present disclosure, a clock signal SCLK and master data MOSI may be modified to be bidirectional signals. Accordingly, the touchscreen driver circuit 130 can transfer the clock signal SCLK or the master data MOSI to the micro control unit 150 through a clock signal line or a master data output line. Here, a signal transferable bidirectionally between the touchscreen driver circuit 130 and the micro control unit 150 may include slave data MISO, in addition to the master data MOSI.

In addition, in a situation in which the touchscreen driver circuit 130 is switched to the sleep mode SLEEP by the sleep module 230, the touchscreen driver circuit 130 can transfer a sleep mode signal SLP to the micro control unit 150, the sleep mode signal SLP indicating entering the sleep mode SLEEP. In addition, a wake-up signal WKUP indicating that the wake-up function WAKE-UP has been performed by the wake-up module 330 can be transferred to the micro control unit 150. Although the touchscreen driver circuit 130 may transfer the sleep mode signal SLP and the wake-up signal WKUP having a single level to the micro control unit 150, the touchscreen driver circuit 130 may include a pad controller 139 to convert the sleep mode signal SLP or the wake-up signal WKUP into a sleep mode signal pattern or a wake-up signal pattern before transfer thereof to the micro control unit 150.

Here, the sleep mode signal pattern or the wake-up signal pattern may be pulsed protocol data, in which a signal having a specific level is toggled periodically or aperiodically at a predetermined frequency, may have a variety of forms.

Figure 7:
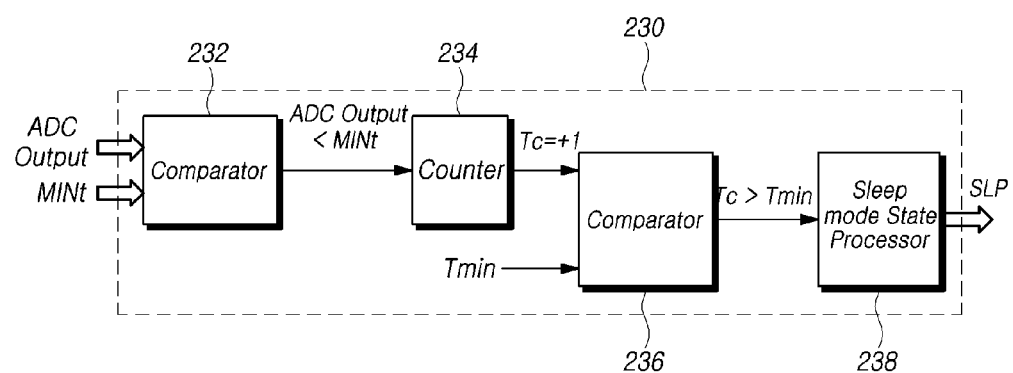
FIG. 7 is a block diagram illustrating the sleep module provided in the touchscreen driver circuit of the touch sensor display device according to embodiments.

FIG. 7 is a block diagram illustrating the sleep module provided in the touchscreen driver circuit of the touch sensor display device according to embodiments.

Referring to FIG. 7, in the touch sensor display device according to the present disclosure, the IC controller 138 of the touchscreen driver circuit 130 may include the sleep module 230 able to control entering the sleep mode SLEEP in a normal state Normal. The sleep module 230 may be provided as hardware in the form of an integrated circuit (IC), or as a module including firmware or software in the touchscreen driver circuit 130.

The sleep module 230 may include a first comparator 232 comparing output data of the analog-to-digital converter, i.e. the touch sensing data, with minimum touch sensing data MINt, a counter 234 counting the number of situations in which the touch sensing data is smaller than the touch sensing data MINt, a second comparator 236 comparing the number Tc counted by the counter 234 with a first reference value Tmin, and a sleep mode state processor 238 controlling the state of the sleep mode SLEEP.

When the touch sensing data, converted into a digital value by the analog-to-digital converter, is transferred to the first comparator 232, the first comparator 232 compares a touch sensing signal TSS, transferred through the touch panel TP, with the minimum touch sensing data MINt. In a situation in which the touch sensing data of the analog-to-digital converter is smaller than the minimum touch sensing data MINt, it is determined that no touch signal has been input, and the counter 234 counts the number Tc of such situations.

The counter 234 continuously counts the number Tc of situations in which the touch sensing data is smaller than the minimum touch sensing data MINt, and transfers the number Tc to the second comparator 236. If the continuous number Tc of situations in which the touch sensing data is smaller than the minimum touch sensing data MINt is equal to or greater than the first reference value Tmin, the second comparator 236 transfers the result to the sleep mode state processor 238. The sleep mode state processor 238 causes the touch sensor display device to enter the sleep mode SLEEP (SLEEP Signaling), generates a sleep mode signal SLP, and transfers the sleep mode signal SLP to the pad controller 139. When the sleep mode signal SLP is received, the pad controller 139 generates a sleep mode signal pattern, and transfers the sleep mode signal pattern to the micro control unit 150. The micro control unit 150 determines that the touchscreen driver circuit 130 has been switched to the sleep mode SLEEP, and also switches to the sleep mode SLEEP. This operation may be realized by hardware, as well as by software.

Figure 8:
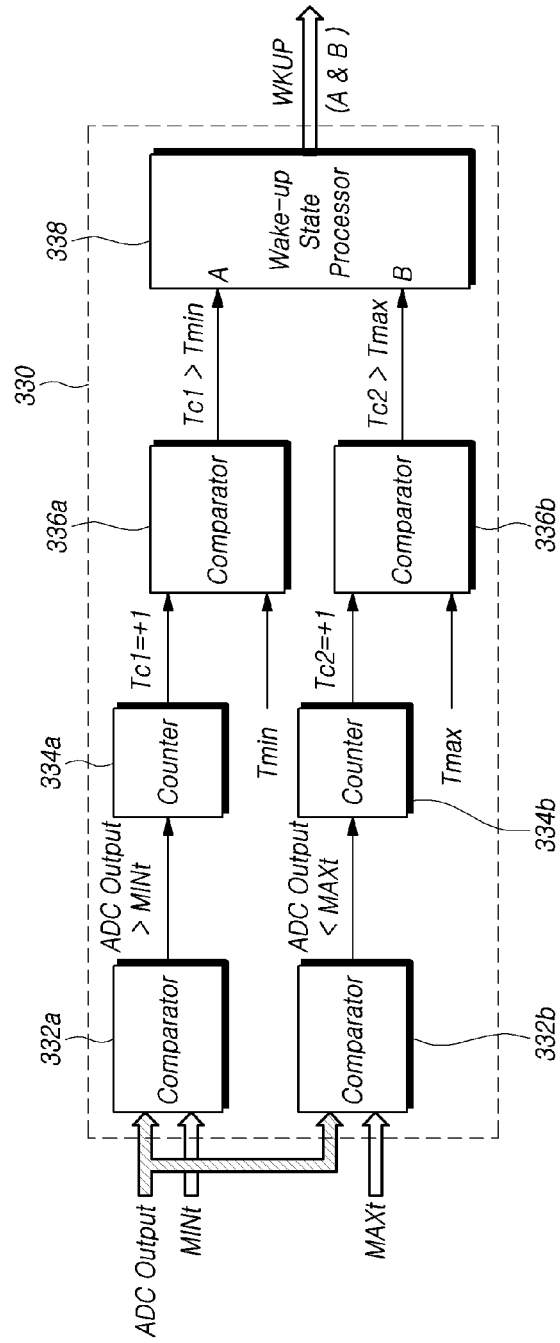
FIG. 8 is a block diagram illustrating the wake-up module provided in the touchscreen driver circuit of the touch sensor display device according to embodiments.

FIG. 8 is a block diagram illustrating the wake-up module provided in the touchscreen driver circuit of the touch sensor display device according to embodiments.

Referring to FIG. 8, in the touch sensor display device according to the present disclosure, the IC controller 138 of the touchscreen driver circuit 130 may include the wake-up module 330 able to control switching from the sleep mode SLEEP to a normal state. The wake-up module 330 may be provided as hardware in the form of an IC, or as a module including firmware or software within the touchscreen driver circuit 130.

The wake-up module 330 includes a first comparator 332a and a second comparator 332b to compare touch sensing data, i.e. data output from the analog-to-digital converter, with minimum touch sensing data MINt and maximum touch sensing data MAXt.

When the sensing data, produced by converting the touch sensing signal TSS, transferred through the touch panel TP, to a digital value by the analog-to-digital converter, is transferred to the first comparator 332a, the first comparator 332a compares the touch sensing data with the minimum touch sensing data MINt. In a situation in which the touch sensing data of the analog-to-digital converter is greater than the minimum touch sensing data MINt, it is determined that a touch signal has been supplied, and a first counter 334a counts the number Tc1 of such situations.

When the touch sensing data, produced by converting the touch sensing signal TSS, transferred through the touch panel TP, into the digital value, by the analog-to-digital converter, is transferred to the second comparator 332b, the second comparator 332b compares the touch sensing data with the maximum touch sensing data MAXt. In a situation in which the touch sensing data of the analog-to-digital converter is smaller than the maximum touch sensing data MAXt, it is determined that a touch signal has been supplied, and a second counter 334b counts the number Tc2 of such situations.

The numbers counted by the first counter 334a and the second counter 334b are transferred to a third comparator 336a and a fourth comparator 336b, respectively.

If the continuous number Tc1 of situations, in which the touch sensing data is greater than the minimum touch sensing data MINt, is equal to or greater than a first reference value Tmin, the third comparator 336a determines that a touch input has been made, and transfers the result to a wake-up state processor 338, so that the touch sensor display device can be switched to a normal state. The wake-up state processor 338 may receive a result signal of the third comparator 336a in node A.

If the continuous number Tc2 of situations, in which the touch sensing data is smaller than the maximum touch sensing data MAXt, is equal to or greater than a second reference value Tmax, the fourth comparator 336b determines that a touch input has been made, and transfers the result to the wake-up state processor 338, so that the touch sensor display device can be switched to the normal state. The wake-up state processor 338 may receive a result signal of the fourth comparator 336b in node B.

In a situation in which the third comparator 336a determines the continuous number Tc1 of situations, in which the touch sensing data is greater than the minimum touch sensing data MINt, to be equal to or greater than the first reference value Tmin, and in a situation in which the fourth comparator 336b determines the continuous number Tc2 of situations, in which the touch sensing data is smaller than the maximum touch sensing data MAXt, to be equal to or greater than the second reference value Tmax, that is to say, in a situation in which the result signals are supplied to both node A and node B, the wake-up state processor 338 causes the touch sensor display device to be switched to a normal state (WAKEUP Signaling), generates a wake-up signal WKUP, and transfers the wake-up signal WKUP to the pad controller 139.

Although the continuous number Tc1 of situations in which the touch sensing data is greater than the minimum touch sensing data MINt and the continuous number Tc2 of situations in which the touch sensing data is smaller than the maximum touch sensing data MAXt may be counted independently of each other, the continuous number Tc1 and the continuous number Tc2 may be counted as a single number in a situation in which both the minimum touch sensing data MINt and the maximum touch sensing data MAXt are compared with any value. In this case, the first reference value Tmin and the second reference value Tmax to be compared may be set as a single reference value.

When the wake-up signal WKUP is received, the pad controller 139 generates a wake-up signal pattern and transfers the wake-up signal pattern to the micro control unit 150. Then, the micro control unit 150 determines that the touchscreen driver circuit 130 has been switched to a normal state, and also switches to the normal state. This operation may be realized by hardware, as well as by software.

In addition, although the pad controller 139 and the IC controller 138 have been described as being separated from each other hereinabove, the configuration of the pad controller 139 and the configuration of the IC controller 138 may be integrated into a single controller.

Figure 9:
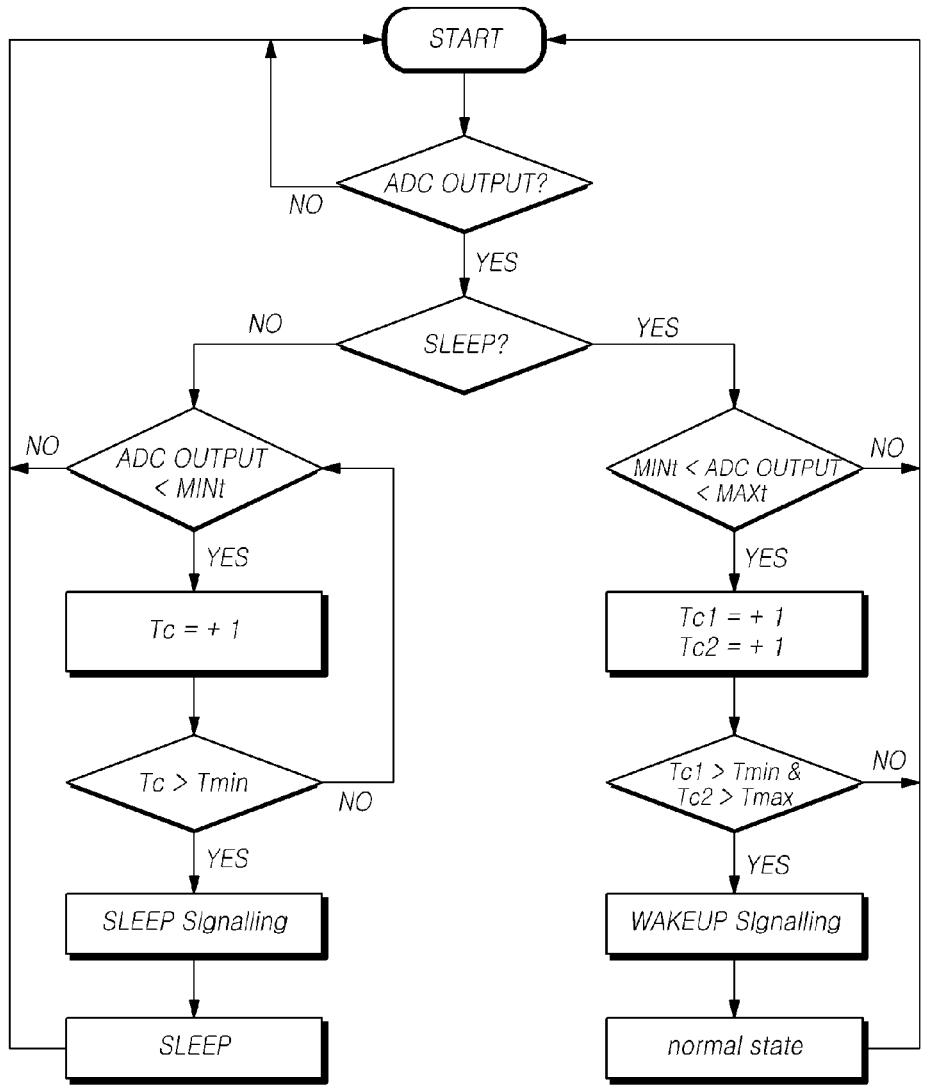
FIG. 9 is a flowchart illustrating the mode switching process of the touchscreen driver circuit described above with reference to FIGS. 7 and 8 according to one embodiment.

FIG. 9 is a flowchart illustrating the mode switching process of the touchscreen driver circuit 130 described above with reference to FIGS. 7 and 8.

Referring to FIG. 9, the mode switching process of the touchscreen driver circuit 130 varies depending on whether a current state is the sleep mode SLEEP or the normal state. If the current state is the normal state, the process of determining whether or not to enter the sleep mode SLEEP may be performed. If the current state is the sleep mode SLEEP, the process of determining whether or not to switch to the normal state through the wake-up function WAKE-UP may be performed.

If the current state is the normal state, it is determined whether or not the touch sensing data output from the analog-to-digital converter is smaller than the minimum touch sensing data MINt. In a situation in which the touch sensing data is smaller than the minimum touch sensing data MINt, it is determined that no touch signal has been supplied, and the number Tc of such situations is counted. Here, the number Tc of situations, in which the touch sensing data is smaller than the minimum touch sensing data MINt, is continuously counted. If the number Tc is equal to or greater than the first reference value Tmin, the touch sensor display device enters the sleep mode SLEEP.

In contrast, if the current state is the sleep mode SLEEP, it is determined whether or not the touch sensing data output from the analog-to-digital converter is greater than the minimum touch sensing data MINt but smaller than the maximum touch sensing data MAXt. If the touch sensing data is greater than the minimum touch sensing data MINt and smaller than the maximum touch sensing data MAXt, it is determined that a touch signal has been supplied, and the numbers Tc1 and Tc2 of such situations are counted respectively. Here, if the number Tc1 of situations, in which the touch sensing data is greater than the minimum touch sensing data MINt, is determined to be equal to or greater than the first reference value Tmin, and the number Tc2 of situations, in which the touch sensing data is smaller than the maximum touch sensing data MAXt, is determined to be equal to or greater than the second reference value Tmax, the touch sensor display device is switched to the normal state.

Figure 10:
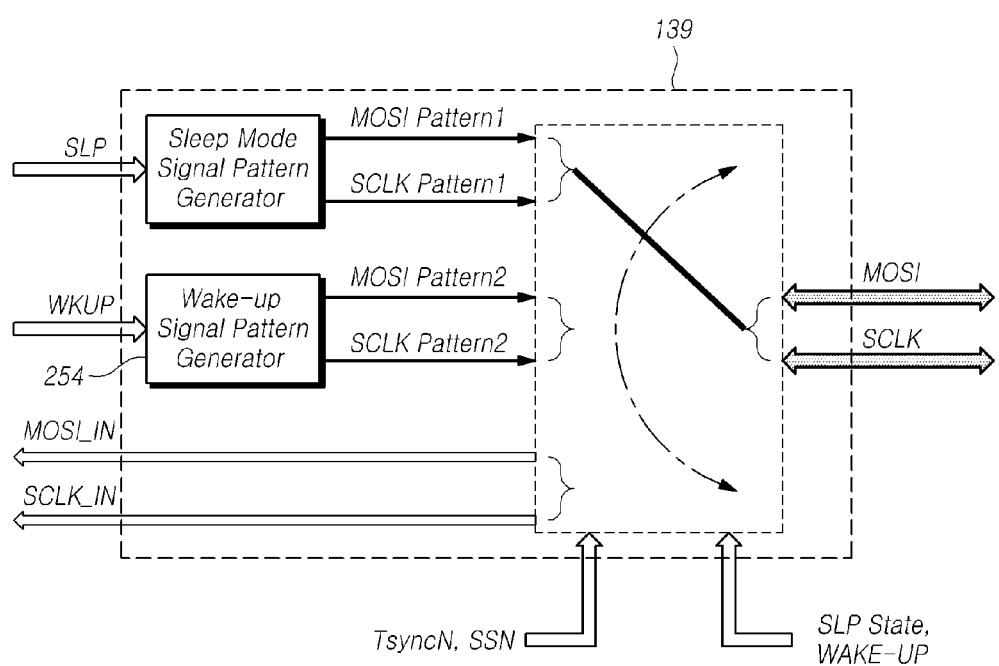
FIG. 10 is a block diagram illustrating the pad controller in the touchscreen driver circuit of the touch sensor display device according to embodiments.

FIG. 10 is a block diagram illustrating the pad controller in the touchscreen driver circuit of the touch sensor display device according to embodiments.

Referring to FIG. 10, in the touch sensor display device according to the present disclosure, the pad controller 139 within the touchscreen driver circuit 130 may include a sleep mode signal pattern generator receiving the sleep mode signal SLP transmitted by the sleep module 230 of the IC controller 138, a wake-up signal pattern generator receiving the wake-up signal WKUP transmitted by the wake-up module 330 of the IC controller 138, and a switching circuit.

When the sleep mode signal SLP commanding switching to the sleep mode SLEEP is applied from the sleep module 230, the sleep mode signal pattern generator generates the sleep mode signal pattern and transmits the sleep mode signal pattern to the micro control unit 150 using the master data MOSI and the clock signal SCLK, so that the micro control unit 150 is switched to the sleep mode SLEEP.

When the wake-up module 330 performs the wake-up function WAKE-UP and the wake-up signal WKUP is transferred responsively, the wake-up signal pattern generator generates the wake-up signal pattern and transmits the wake-up signal pattern to the micro control unit 150 using the master data MOSI and the clock signal SCLK, so that the micro control unit 150 is switched to the normal state.

The switching circuit determines directions in which the master data MOSI and the clock signal SCLK, corresponding to bidirectional signals, are transferred. For example, when the sleep mode signal SLP is applied or the wake-up signal WKUP is applied, the switch is operated in a direction in which the corresponding signal is transferred to the micro control unit 150. In contrast, when the master data MOSI and the clock signal SCLK are transferred to the touchscreen driver circuit 130, the switch is operated in a direction in which the corresponding signals are transferred to the touchscreen driver circuit 130.

In addition, at least a portion of the touchscreen driver circuit 130 of the touch sensor display device may be integrated with the data driver circuit 120 into a single IC. Such a single IC comprised of at least a portion of the touchscreen driver circuit 130 and at least a portion of the data driver circuit 120 may be referred to as a source readout IC (SRIC).

Figure 11:
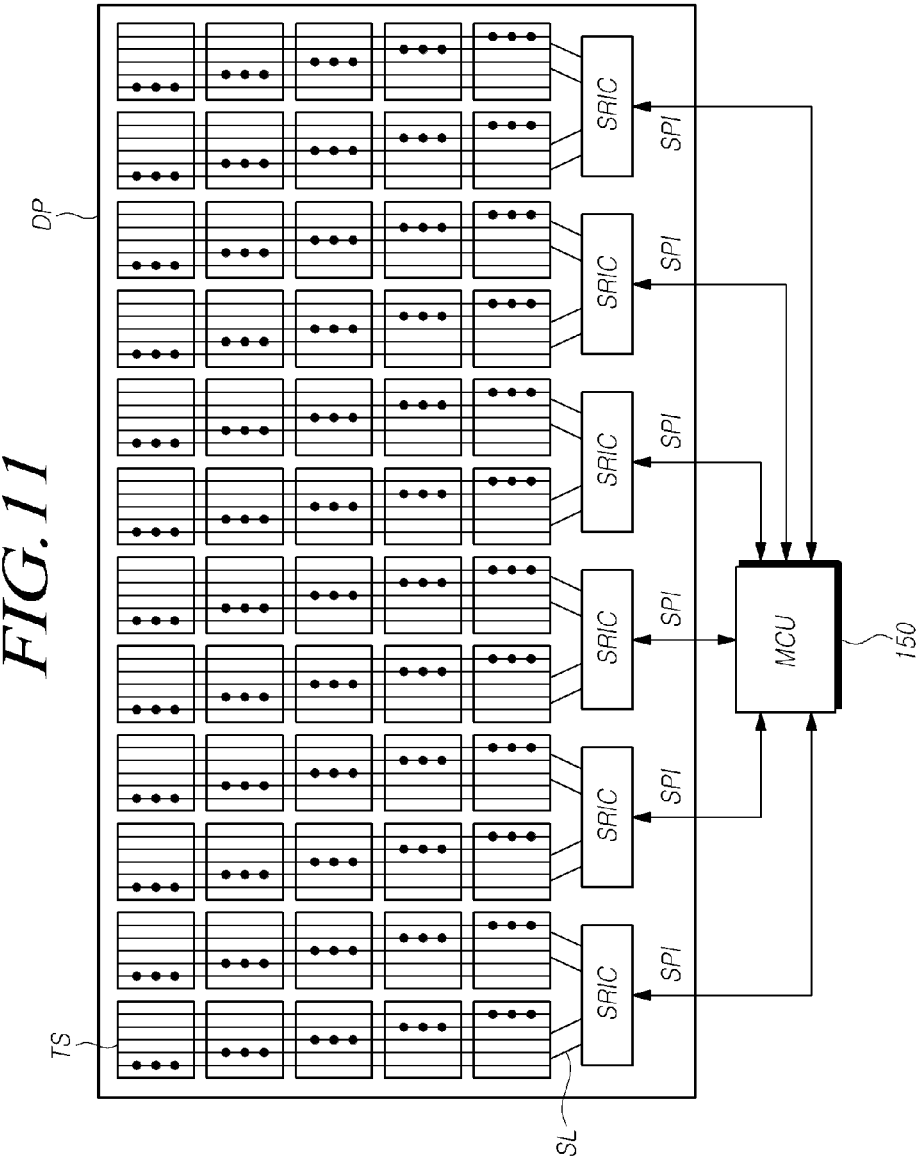
FIG. 11 is a block diagram illustrating an array of SRICs in the touch sensor display device according to embodiments.

FIG. 11 is a block diagram illustrating an array of SRICs in the touch sensor display device according to embodiments.

Referring to FIG. 11, the micro control unit 150 may be mounted on a printed circuit board (PCB) electrically connected to the display panel DP. Here, the SRICs may be directly bonded to the display panel DP by a chip-on-glass (COG) process, and the micro control unit 150 and the SRICs are connected via interfaces SPI. Accordingly, the micro control unit 150 can selectively transfer and receive signals to and from some SRICs among the plurality of SRICs, and can switch to the sleep mode SLEEP or perform the wake-up function WAKE-UP with respect to some subpixels connected to some sensing lines SL among a plurality of sensing lines SL through the some SRICs.

Alternatively, an IC structure comprised of a portion of the touchscreen driver circuit 130 may be referred to as a read-out IC (ROIC). The micro control unit 150 can enter the sleep mode SLEEP or perform the wake-up function WAKE-UP with respect to any ROIC.

Figure 12:
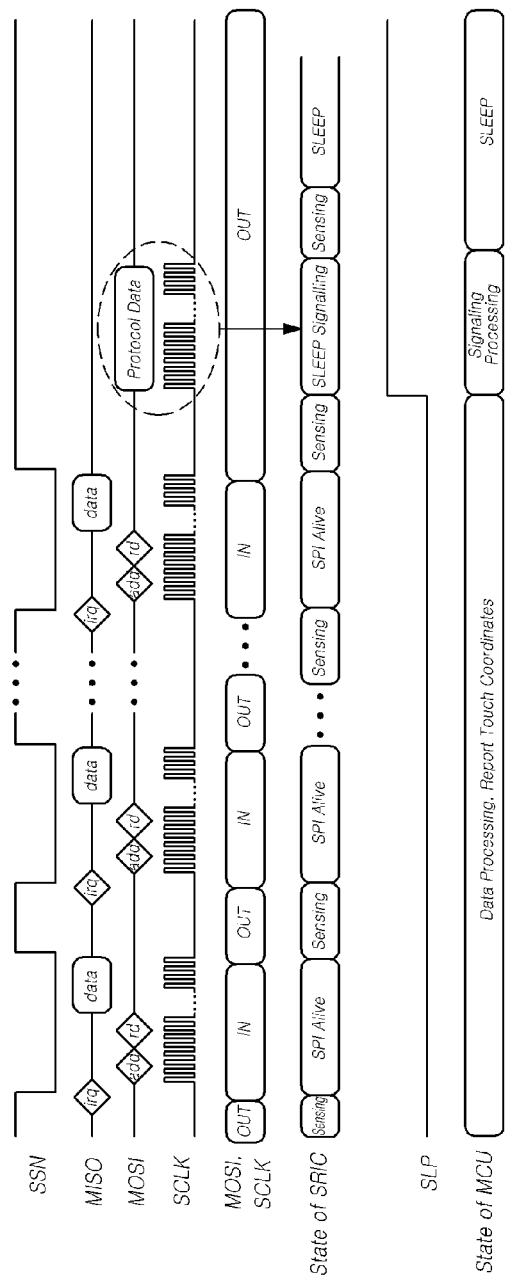
FIG. 12 is a signal waveform diagram illustrating a situation in which the touchscreen driver circuit of the touch sensor display device enters the sleep mode according to one embodiment.
Figure 13:
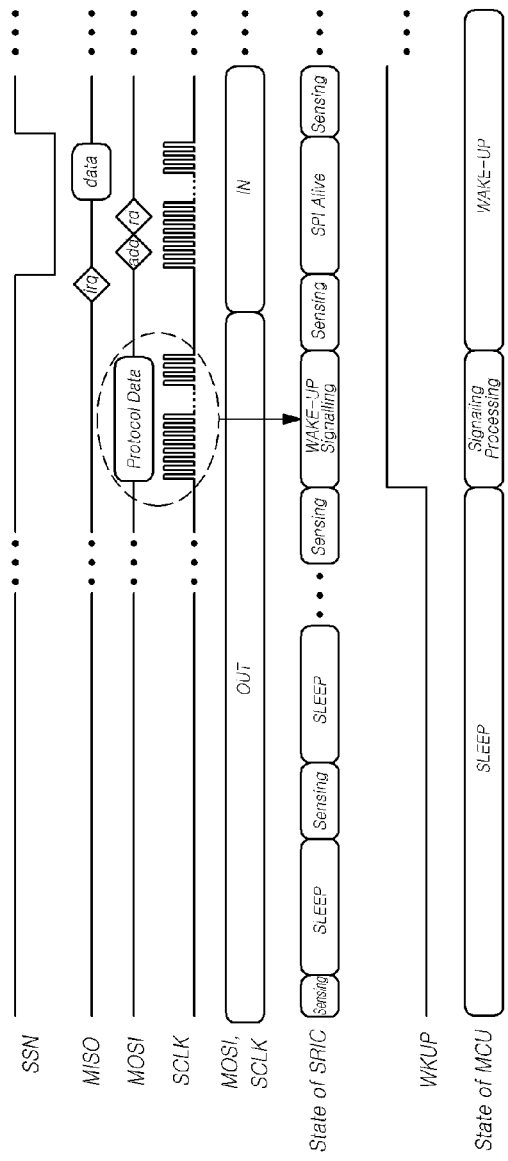
FIG. 13 is a signal waveform diagram illustrating a situation in which the touchscreen driver circuit of the touch sensor display device performs the wake-up function according to one embodiment.

FIG. 12 is a signal waveform diagram illustrating a situation in which the touchscreen driver circuit of the touch sensor display device according to embodiments enters the sleep mode SLEEP, while FIG. 13 is a signal waveform diagram illustrating a situation in which the touchscreen driver circuit of the touch sensor display device according to embodiments performs the wake-up function WAKE-UP.

In an embodiment of the touch sensor display device according to the present disclosure, the clock signal SCLK and the master data MOSI, among interface signals between the touchscreen driver circuit 130 and the micro control unit 150, are modified to bidirectional signals, such that the touchscreen driver circuit 130 can transmit the master data MOSI in synchronization with the clock signal SCLK. Here, a direction in which the master data MOSI is transferred from the touchscreen driver circuit 130 to the micro control unit 150 is indicated with "OUT" in the drawing. In contrast, a direction in which the master data MOSI is transferred from the micro control unit 150 to the touchscreen driver circuit 130 may be indicated with "IN."

As described above, the touchscreen driver circuit 130 transmits the sleep mode signal pattern, corresponding to the sleep mode SLEEP, to the micro control unit 150 through the master data output line while entering the sleep mode SLEEP by itself, so that the micro control unit 150, which has received the master data MOSI, can responsively enter the sleep mode SLEEP. Since the master data MOSI can be transmitted bidirectionally, a signal pattern for entering the sleep mode SLEEP or performing the wake-up function WAKE-UP can be generated by not only the touchscreen driver circuit 130 but also the micro control unit 150.

FIG. 14 is a table illustrating values of interface signals and signal transfer directions according to respective states in the touch sensor display device according to embodiments.

Referring to FIG. 14, in a normal state Normal Operation, slave data MISO may be transmitted in a direction from the touchscreen driver circuit 130 to the micro control unit 150, and the other signals, including a slave selection signal SSN, a clock signal SCLK, and master data MOSI, may be transmitted in a direction from the micro control unit 150 to the touchscreen driver circuit 130.

However, since the clock signal SCLK and the master data MOSI can be transmitted bidirectionally in the case of entering the sleep mode SLEEP or performing the wake-up function WAKE-UP, the direction of transmission can be changed to a direction OUT from the touchscreen driver circuit 130 to the micro control unit 150.

In addition, in an SRIC structure in which the touchscreen driver circuit 130 and a portion of the data driver circuit 120 are implemented as an IC, entering the sleep mode SLEEP or performing the wake-up function WAKE-UP can be controlled according to each SRIC among the plurality of SRICs. In FIG. 15, an example in which mode switching is performed according to the SRICs is illustrated.

Referring to FIG. 15, eight (8) SRICs may be in the sleep mode SLEEP or the normal state Normal independently. For example, the first SRIC SRIC #1, the second SRIC SRIC #2, the sixth SRIC SRIC #6, and the eighth SRIC SRIC #8 can be in the sleep mode SLEEP, while the third to fifth SRICs SRIC #3 to SRIC #5 and the seventh SRIC SRIC #7 may be in the normal state Normal.

When the SRIC is in the sleep mode SLEEP, the clock signal SCLK and the master data MOSI can be transmitted in a direction OUT from the touchscreen driver circuit 130 to the micro control unit 150, and a touch synchronization signal TsyncN can be applied in the form of a pulse.

In contrast, when the SRIC is in the normal state Normal, the clock signal SCLK and the master data MOSI can be transmitted in a direction IN from the micro control unit 150 to the touchscreen driver circuit 130. In this situation, the operation state of the touchscreen driver circuit 130 can be changed under the control of the micro control unit 150. In addition, when the SRIC is in the normal state Normal, the touchscreen driver circuit 130 can also enter the sleep mode SLEEP through the sleep module 230.

Although the directions of transmission of the clock signal SCLK and the master data MOSI depending on the state of the SRIC and the function of the touch synchronization signal TsyncN have been illustrated hereinabove, specific states may be set differently according to the configurations of the sleep module 230 and the wake-up module 330.

FIG. 16 is a table illustrating a situation in which the direction of transmission of the clock signal SCLK and the master data MOSI is changed in the touch sensor display device according to embodiments.

Referring to FIG. 16, in a situation in which the clock signal SCLK and the master data MOSI are transmitted in a direction IN from the micro control unit 150 to the touchscreen driver circuit 130, the micro control unit 150 can change the direction of transmission of the clock signal SCLK and the master data MOSI using a master data protocol.

In addition, in a situation in which the clock signal SCLK and the master data MOSI are transmitted in a direction OUT from the touchscreen driver circuit 130 to the micro control unit 150, the touchscreen driver circuit 130 can enter the sleep mode SLEEP or perform the wake-up function WAKE-UP before transferring a state of the sleep mode SLEEP or a normal state obtained through wake-up function WAKE-UP to the micro control unit 150 using the clock signal SCLK and the master data MOSI.

In addition, in a situation in which the clock signal SCLK and the master data MOSI are transmitted in the direction OUT from the touchscreen driver circuit 130 to the micro control unit 150, the micro control unit 150 is also required to be able to switch the direction of transmission of the clock signal SCLK and the master data MOSI. However, in a state in which the clock signal SCLK and the master data MOSI are transmitted in the direction OUT from the touchscreen driver circuit 130 to the micro control unit 150, the micro control unit 150 cannot use the master data protocol, and thus, it is necessary to use another method.

In this regard, the touch sensor display device according to the present disclosure can use a touch synchronization signal TsyncN and a slave selection signal SSN to enable switching between a display driving period Td and a touch driving period Tt.

Figure 17:
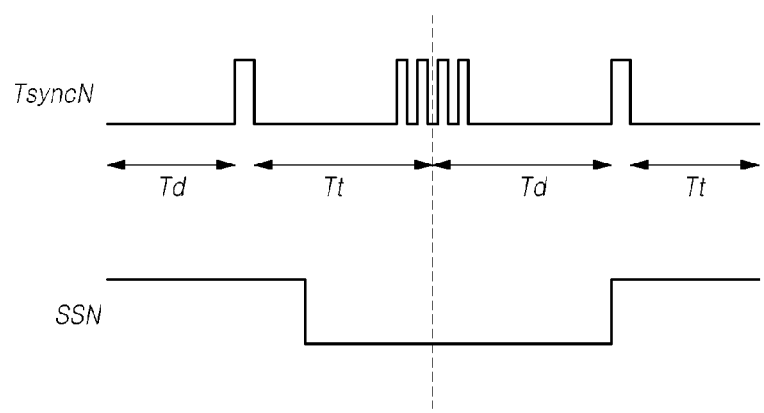
FIG. 17 is a signal waveform diagram illustrating the specification of a touch synchronization signal and a slave selection signal in the touch sensor display device according to embodiments.

FIG. 17 is a signal waveform diagram illustrating the specification of a touch synchronization signal and a slave selection signal in the touch sensor display device according to embodiments.

Referring to FIG. 17, the touch sensor display device according to embodiments can enable switching between the display driving period Td and the touch driving period Tt using a combination of the pulsed touch synchronization signal TsyncN and slave selection signal SSN while allowing the clock signal SCLK and the master data MOSI to be transferred bidirectionally.

First, the touch synchronization signal TsyncN is generated in the form of a pulse. When a unit pulse is applied to the touch synchronization signal TsyncN in the display driving period Td, the display driving period Td is switched to the touch driving period T. Here, when a pulse is applied to the touch synchronization signal TsyncN in the touch driving period Tt, the touch driving period Tt is not changed to the display driving period Td. When the touch synchronization signal TsyncN is toggled to a specific protocol in a low-level state of the slave selection signal SSN, the touch driving period Tt is changed to the display driving period Td.

That is, since the slave selection signal SSN is a unidirectional signal transferred in a direction from the micro control unit 150 to the touchscreen driver circuit 130, the micro control unit 150 can control directions in which the clock signal SCLK and the master data MOSI are transmitted by controlling the slave selection signal SSN.

Although directions of transmission of the clock signal SCLK and the master data MOSI have been described as being controlled using the slave selection signal SSN herein, it is possible to control directions of transmission of the clock signal SCLK and the master data MOSI using other signals.

Figure 18:
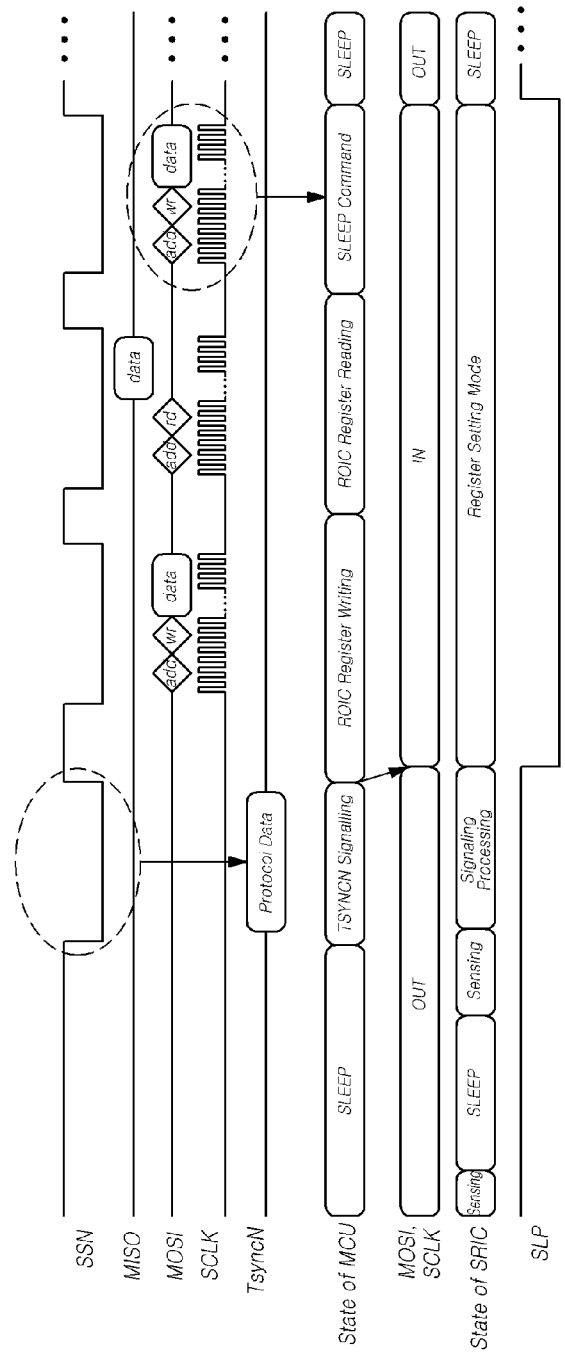
FIG. 18 is a signal waveform diagram illustrating a situation in which entering the sleep mode is performed under the control of the micro control unit in the touch sensor display device according to embodiments.

FIG. 18 is a signal waveform diagram illustrating a situation in which entering the sleep mode SLEEP is performed under the control of the micro control unit in the touch sensor display device according to embodiments, and FIG. 19 is a signal waveform diagram illustrating a situation in which entering the wake-up function WAKE-UP is performed under the control of the micro control unit in the touch sensor display device according to embodiments.

As illustrated in the drawings, in a low-level state of a slave selection signal SSN, predetermined protocol data can be applied by toggling a touch synchronization signal TsyncN. In response to the protocol data of the touch synchronization signal TsyncN, an input direction of the clock signal SCLK and the master data MOSI is switched to a direction IN from the micro control unit 150 to the touchscreen driver circuit 130. Accordingly, the micro control unit 150 can transmit a clock signal SCLK and master data MOSI, as intended, to the touchscreen driver circuit 130.

In this state, the micro control unit 150 transfers a SLEEP command, which requests to switch to the sleep mode SLEEP, to the touchscreen driver circuit 130 using the clock signal SCLK and the master data MOSI, so that the touchscreen driver circuit 130 can be switched to the sleep mode SLEEP by the SLEEP command.

In a situation in which the wake-up function WAKE-UP is performed to the touchscreen driver circuit 130 (or SRIC) in the sleep mode SLEEP, the same process can be performed. That is, in a low-level state of the slave selection signal SSN, the micro control unit 150 applies predetermined protocol data by toggling the touch synchronization signal TsyncN. In response to the protocol data of the touch synchronization signal TsyncN, the input direction of the clock signal SCLK and the master data MOSI is switched to the direction IN from the micro control unit 150 to the touchscreen driver circuit 130. The micro control unit 150 can transmit the clock signal SCLK and the master data, as intended, to the touchscreen driver circuit 130.

In this state, the micro control unit 150 transfers a command for the wake-up function WAKE-UP to the touchscreen driver circuit 130 using the clock signal SCLK and the master data MOSI, so that the touchscreen driver circuit 130 (or SRIC) can perform the wake-up function WAKE-UP.

As described above, the touch sensor display device according to the present disclosure can set the clock signal SCLK and the master data MOSI to be transmitted bidirectionally, so that the touchscreen driver circuit 130 (or SRIC) can be switched to the sleep mode SLEEP or the wake up WAKE-UP by itself. The micro control unit 150 can also control the direction of transmission of the clock signal SCLK and the master data MOSI using the slave selection signal SSN and the touch synchronization signal TsyncN, so that the micro control unit 150 can enter the sleep mode SLEEP or perform the wake-up function WAKE-UP. Accordingly, it is possible to effectively reduce power consumption in the sleep mode SLEEP.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A touch sensor display device comprising:
    a display panel in which a touch panel, a plurality of gate lines, a plurality of data lines, a plurality of sensing lines, and a plurality of subpixels are disposed;
    a gate driver circuit disposed on a first side of the display panel to drive the plurality of gate lines;
    a data driver circuit disposed on a second side of the display panel to drive the plurality of data lines;
    a touchscreen driver circuit disposed on a third side of the display panel to drive the plurality of sensing lines, and including a sleep module which controls a switching to a sleep mode, and a wake-up module which performs a wake-up function to cancel and return to a normal state, and transmitting a sleep mode signal pattern or a wake-up signal pattern to a micro control unit using a bidirectional interface signal; and
    the micro control unit determining whether or not a touch is detected, by the touchscreen driver circuit,
    wherein the touchscreen driver circuit includes:
        a sleep mode signal pattern generator receiving a sleep mode signal transmitted by the sleep module and generating the sleep mode signal pattern;
        a wake-up signal pattern generator receiving a wake-up signal transmitted by the wake-up module and generating the wake-up signal pattern; and
        a switch circuit controlling a direction, in which the bidirectional interface signal is transmitted, using a reference signal.

2. The touch sensor display device according to claim 1, wherein the sleep module includes:
    a first comparator comparing touch sensing data transmitted through the plurality of sensing lines with minimum touch sensing data;
    a counter counting a number of situations in which the touch sensing data is smaller than the minimum touch sensing data, according to an output value of the first comparator;
    a second comparator comparing a count value of the counter with a minimum count value; and
    a state output element receiving an output of the second comparator, and when the value count of the counter is equal to or greater than the minimum count value, generating the sleep mode signal.

3. The touch sensor display device according to claim 1, wherein the wake-up module includes:
    a first comparator comparing touch sensing data transmitted through the plurality of sensing lines with minimum touch sensing data;
    a second comparator comparing the touch sensing data transmitted through the plurality of sensing lines with maximum touch sensing data;
    a first counter counting a number of situations in which the touch sensing data is greater than the minimum touch sensing data, according to an output value of the first comparator;
    a second counter counting a number of situations in which the touch sensing data is smaller than the maximum touch sensing data, according to an output value of the second comparator;
    a third comparator comparing a count value of the first counter with a minimum count value;
    a fourth comparator comparing a count value of the second counter with a maximum count value; and
    a state output element receiving outputs of the third and fourth comparators, and when the count value of the first counter is equal to or greater than the minimum count value and the count value of the second counter is equal to or greater than the maximum count value, generating the wake-up signal.

4. The touch sensor display device according to claim 1, wherein the bidirectional interface signal comprises a clock signal and a master data signal.

5. The touch sensor display device according to claim 1, wherein the reference signal comprises a touch synchronization signal and a slave selection signal.

6. The touch sensor display device according to claim 5, wherein, if the touch synchronization signal is applied as a pulse, the touchscreen driver circuit controls a transition from a display driving period to a touch driving period.

7. The touch sensor display device according to claim 6, wherein, in a low-level state of the slave selection signal, if predetermined protocol data is input to the touch synchronization signal, the direction in which the bidirectional interface signal is transmitted, is set to be a direction from the micro control unit to the touchscreen driver circuit.

8. A touchscreen driver circuit in a touch sensor display device, wherein the touch sensor display device includes a display panel in which a plurality of gate lines, a plurality of data lines, a plurality of sensing lines, and a plurality of subpixels are disposed, a gate driver circuit driving the plurality of gate lines, a data driver circuit driving the plurality of data lines, the touchscreen driver circuit driving a plurality of sensing lines, and a micro control unit determining whether or not a touch is detected, by the touchscreen driver circuit, the touchscreen driver circuit comprising:

a sleep module controlling switching to a sleep mode; and
a wake-up module performing a wake-up function to cancel and return to a normal state,
wherein the touchscreen driver circuit transmits a sleep mode signal pattern or a wake-up signal pattern to the micro control unit using a bidirectional interface signal, and
wherein the sleep module includes:
a first comparator comparing touch sensing data transmitted through the plurality of sensing lines with minimum touch sensing data;
a first counter counting a number of situations in which the touch sensing data is smaller than the minimum touch sensing data, according to an output value of the first comparator;
a second comparator comparing a count value of the first counter with a minimum count value; and
a first state output element receiving an output of the second comparator, and when the value count of the first counter is equal to or greater than the minimum count value, generating a sleep mode signal.

9. The touchscreen driver circuit according to claim 8, wherein the wake-up module includes:
a third comparator comparing the touch sensing data transmitted through the plurality of sensing lines with the minimum touch sensing data;
a fourth comparator comparing the touch sensing data transmitted through the plurality of sensing lines with maximum touch sensing data;
a second counter counting a number of situations in which the touch sensing data is greater than the minimum touch sensing data, according to an output value of the third comparator;
a third counter counting a number of situations in which the touch sensing data is smaller than the maximum touch sensing data, according to an output value of the fourth comparator;
a fifth comparator comparing a count value of the second counter with the minimum count value;
a sixth comparator comparing a count value of the third counter with a maximum count value; and
a second state output element receiving outputs of the fifth and sixth comparators, and when the count value of the second counter is equal to or greater than the minimum count value and the count value of the third counter is equal to or greater than the maximum count value, generating a wake-up signal.

10. The touchscreen driver circuit according to claim 8, wherein the bidirectional interface signal comprises a clock signal and a master data signal.

11. The touchscreen driver circuit according to claim 8, wherein the touchscreen driver circuit includes:
a sleep mode signal pattern generator receiving the sleep mode signal transmitted by the sleep module and generating the sleep mode signal pattern;
a wake-up signal pattern generator receiving a wake-up signal transmitted by the wake-up module and generating the wake-up signal pattern; and
a switch circuit controlling a direction, in which the bidirectional interface signal is transmitted, using a reference signal.

12. The touchscreen driver circuit according to claim 11, wherein the reference signal comprises a touch synchronization signal and a slave selection signal.

13. The touchscreen driver circuit according to claim 12, wherein, if the touch synchronization signal is applied as a pulse, the touchscreen driver circuit controls a transition from a display driving period to a touch driving period.

14. The touchscreen driver circuit according to claim 13, wherein, in a low-level state of the slave selection signal, if predetermined protocol data is input to the touch synchronization signal, the direction, in which the bidirectional interface signal is transmitted, is set to be a direction from the micro control unit to the touchscreen driver circuit.

15. An interface method of a touch sensor display device, wherein the touch sensor display device includes a display panel in which a plurality of gate lines, a plurality of data lines, a plurality of sensing lines, and a plurality of subpixels are disposed, a gate driver circuit driving the plurality of gate lines, a data driver circuit driving the plurality of data lines, a touchscreen driver circuit driving a plurality of sensing lines, and a micro control unit determining whether or not a touch is detected, by the touchscreen driver circuit, the interface method comprising:

when a touch sensing signal has not been input for a predetermined period through the sensing line, determining, by the touchscreen driver circuit, to switch to a sleep mode, and outputting a sleep mode signal;
when the touch sensing signal is input in the sleep mode, determining, by the touchscreen driver circuit, to perform a wake-up function, and outputting a wake-up signal; and
receiving the sleep mode signal or the wake-up signal and determine to enter the sleep mode or perform the wake-up function,
wherein the touchscreen driver circuit transmits a sleep mode signal pattern or a wake-up signal pattern to the micro control unit using a bidirectional interface signal,
wherein the touchscreen driver circuit includes:
a sleep mode signal pattern generator receiving the sleep mode signal transmitted by a sleep module and generating the sleep mode signal pattern;
a wake-up signal pattern generator receiving the wake-up signal transmitted by a wake-up module and generating the wake-up signal pattern; and
a switch circuit controlling a direction, in which the bidirectional interface signal is transmitted, using a reference signal.

16. The interface method according to claim 15, wherein the bidirectional interface signal comprises a clock signal and a master data signal.

17. The interface method according to claim 15, wherein a direction, in which the bidirectional interface signal is transmitted, is controlled using a reference signal.

18. The interface method according to claim 17, wherein the reference signal comprises a touch synchronization signal and a slave selection signal.

19. The interface method according to claim 18, wherein, if the touch synchronization signal is applied as a pulse, the touchscreen driver circuit controls a transition from a display driving period to a touch driving period.

* * * * *